US010642237B2

(12) United States Patent
Feng et al.

(10) Patent No.: US 10,642,237 B2
(45) Date of Patent: May 5, 2020

(54) AMI BASED VOLT-VAR OPTIMIZATION USING ONLINE MODEL LEARNING

(71) Applicant: ABB Schweiz AG, Baden (CH)

(72) Inventors: Xiaoming Feng, Cary, NC (US); Ning Kang, Morrisville, NC (US)

(73) Assignee: ABB SCHWEIZ AG, Baden (CH)

( * ) Notice: Subject to any disclaimer, the term of this patent is extended or adjusted under 35 U.S.C. 154(b) by 91 days.

(21) Appl. No.: 15/971,655

(22) Filed: May 4, 2018

(65) Prior Publication Data

US 2018/0321650 A1 Nov. 8, 2018

Related U.S. Application Data

(63) Continuation of application No. PCT/US2016/061104, filed on Nov. 9, 2016.
(Continued)

(51) Int. Cl.
*G05B 19/042* (2006.01)
*H02J 3/16* (2006.01)
(Continued)

(52) U.S. Cl.
CPC .............. *G05B 19/042* (2013.01); *H02J 3/16* (2013.01); *H02J 3/381* (2013.01);
(Continued)

(58) Field of Classification Search
CPC .......... G05B 19/042; G05B 2219/2639; H04Q 9/02; H04Q 2209/60; H04Q 2213/13544
See application file for complete search history.

(56) References Cited

U.S. PATENT DOCUMENTS 5,081,591 A   1/1992   Hanway et al.
5,821,716 A * 10/1998   Okanik .................. G05F 1/147
                                                318/478
(Continued)

FOREIGN PATENT DOCUMENTS

CN   102565557 A * 7/2012
EP   2858201 A1    4/2015

OTHER PUBLICATIONS

European Patent Office, Extended Search Report issued in Application No. 16864901.0, dated 27 Feb. 27, 2019, 14 pp.
(Continued)

*Primary Examiner* — Thomas C Lee
*Assistant Examiner* — Michael Tang
(74) *Attorney, Agent, or Firm* — Taft Stettinius & Hollister LLP; J. Bruce Schelkopf (57) ABSTRACT

The present application relates generally to Volt-VAR optimization for power distribution systems having advanced metering infrastructure (AMI). Distributed energy resources (DER) such as photovoltaic arrays are becoming prevalent in distribution systems. These DER systems inject power into the distribution system which can cause unfavorable changes, such as a rise in voltage across the feeder lines of the distribution system. Existing control proposals suffer from a number of shortcomings, drawbacks and disadvantages. In some instances, traditional controllers for distribution systems with DER systems may require information related to the arrangement of the distribution system which is unknown and cannot be provided by the advanced metering infrastructure. There remains a significant need for the apparatuses, methods, systems and techniques disclosed herein.

21 Claims, 4 Drawing Sheets

Related U.S. Application Data (60) Provisional application No. 62/252,812, filed on Nov. 9, 2015.

(51) Int. Cl.
  *H02J 3/38* (2006.01)
  *H02J 13/00* (2006.01)
  *H04Q 9/02* (2006.01)

(52) U.S. Cl.
  CPC ........... *H02J 13/0006* (2013.01); *H04Q 9/02* (2013.01); *G05B 2219/2639* (2013.01); *H02J 2203/20* (2020.01); *H04Q 2209/60* (2013.01); *H04Q 2213/13544* (2013.01); *Y02E 40/34* (2013.01); *Y02E 40/72* (2013.01); *Y02E 40/76* (2013.01); *Y02E 60/726* (2013.01); *Y02E 60/74* (2013.01); *Y04S 10/12* (2013.01); *Y04S 10/24* (2013.01); *Y04S 10/30* (2013.01); *Y04S 10/545* (2013.01)

(56) References Cited

U.S. PATENT DOCUMENTS

| | | | |
|---|---|---|---|
| 2009/0043519 A1 | 2/2009 | Bridges et al. | |
| 2009/0157573 A1* | 6/2009 | Anderson | G06N 20/00 706/12 |
| 2011/0084672 A1 | 4/2011 | Labuschagne et al. | |
| 2012/0133209 A1 | 5/2012 | O'Brien et al. | |
| 2012/0249278 A1 | 10/2012 | Krok et al. | |
| 2013/0024032 A1* | 1/2013 | Vukojevic | H02J 3/1828 700/291 |
| 2013/0030598 A1 | 1/2013 | Milosevic et al. | |
| 2013/0184894 A1* | 7/2013 | Sakuma | H02J 3/12 700/298 |
| 2014/0018969 A1 | 1/2014 | Forbes, Jr. | |
| 2014/0062426 A1* | 3/2014 | Yang | H02J 3/18 323/209 |
| 2015/0112496 A1 | 4/2015 | Fisher et al. | |
| 2015/0153153 A1* | 6/2015 | Premm | H02J 3/00 700/298 |
| 2015/0311718 A1 | 10/2015 | Divan et al. | |
| 2016/0028325 A1* | 1/2016 | Redmann | H02M 7/53871 363/98 |

OTHER PUBLICATIONS

International Bureau of WIPO, International Preliminary Report on Patentability issued in Application No. PCT/US2016/061104, dated May 24, 2018, 9 pp.

International Searching Authority/US, International Search Report & Written Opinion issued in Application No. PCT/US2016/061104, dated Mar. 3, 2017, 12 pp.

* cited by examiner

AMI BASED VOLT-VAR OPTIMIZATION USING ONLINE MODEL LEARNING

BACKGROUND

The present application relates generally to Volt-VAR optimization for power distribution systems having advanced metering infrastructure (AMI). Distributed energy resources (DER) such as photovoltaic arrays are becoming prevalent in distribution systems. These DER systems inject power into the distribution system which can cause unfavorable changes, such as a rise in voltage across the feeder lines of the distribution system. Existing control proposals suffer from a number of shortcomings, drawbacks and disadvantages. In some instances, traditional controllers for distribution systems with DER systems may require information related to the arrangement of the distribution system which is unknown and cannot be provided by the advanced metering infrastructure. There remains a significant need for the apparatuses, methods, systems and techniques disclosed herein.

SUMMARY

Apparatuses, methods, and systems featuring; Volt-VAR optimization for power distribution systems are disclosed. One exemplary embodiment is a power device controller for controlling a power distribution system having a at least one feeder, at least one electromechanical device and at least one distributed energy resource without using a power flow model, the controller comprising: a communication transceiver, a memory device, and a processing unit. The processing unit is structured to receive electrical measurements from the communication transceiver, transmit perturbation signals and control signals to the communication transceiver, receive data stored on the memory device, and transmit data to the memory device to be stored. The processing unit is further programmed to receive historical electrical measurements generated by the plurality of electronic power meters, determine the sensitivities of system voltages over the change in aggregate real power consumption, aggregate reactive power consumption, aggregate distributed energy resource real power generation, and aggregate distributed energy resource reactive power generation, switched capacitor bank reactive power generation and voltage regulator tap position, identify a predictive model based on the determined voltage sensitivities, and transmit at least one command signal to the communication transceiver, each command signal being structured to modify power line characteristics by controlling a setting of one of the electromechanical devices or one setting of the distributed energy resources. Further embodiments, forms, objects, features, advantages, aspects, and benefits shall become apparent from the following description and drawings.

BRIEF DESCRIPTION OF THE DRAWINGS

For the purposes of clearly, concisely and exactly describing exemplary embodiments of the present disclosure, the manner and process of making and using the same, and to enable the practice, making and use of the same, reference will now be made to certain exemplary embodiments, including those illustrated in the figures, and specific language will be used to describe the same. It shall nevertheless be understood that no limitation of the scope of the present disclosure is thereby created, and that the present disclosure includes and protects such alterations, modifications, and further applications of the exemplary embodiments as would occur to one skilled in the art.

DETAILED DESCRIPTION OF ILLUSTRATIVE EMBODIMENTS

Figure 1:
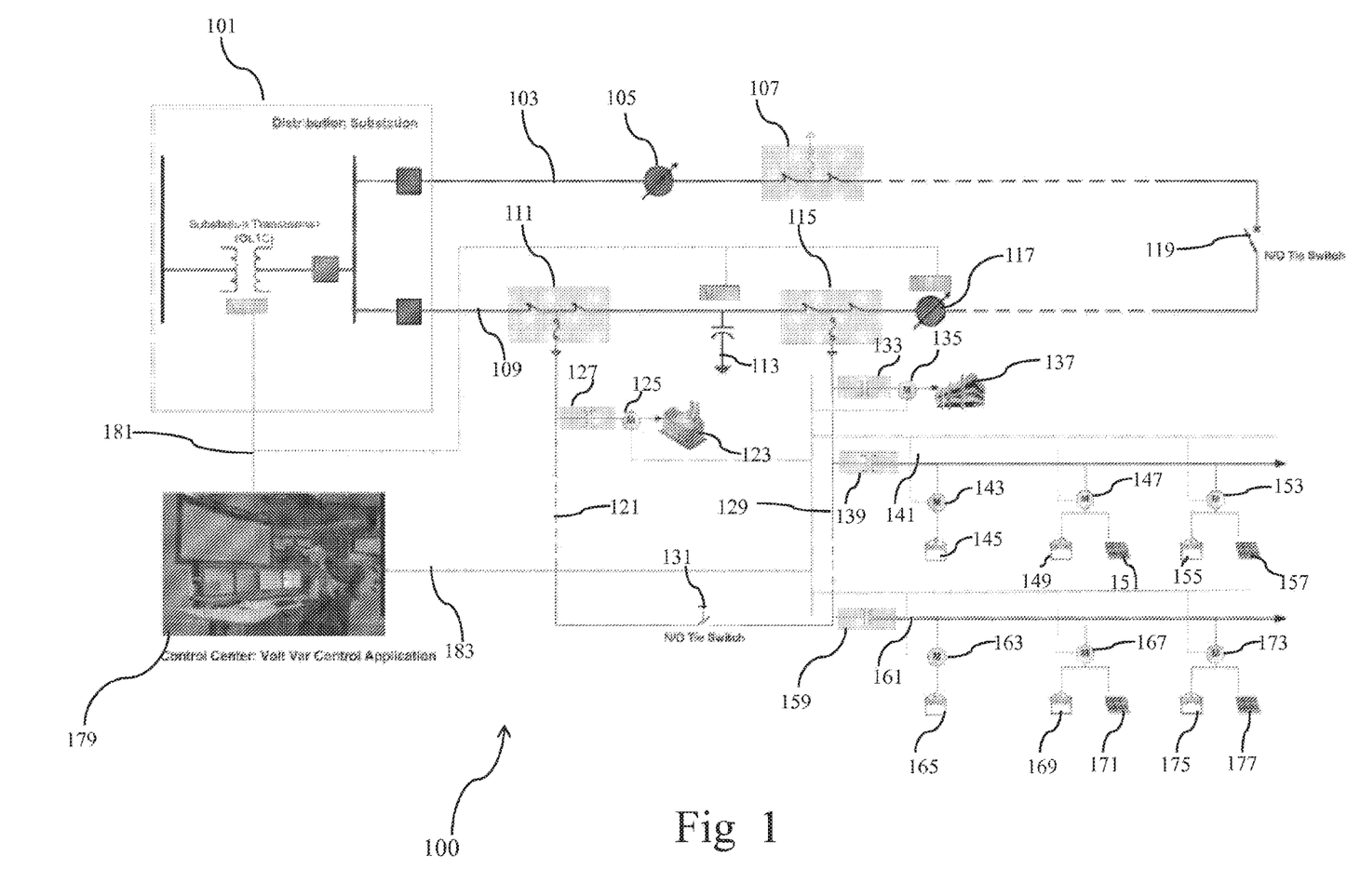
FIG. 1 is a schematic diagram illustrating an exemplary power distribution system.

With reference to FIG. 1 there is illustrated an exemplary power distribution system 100. The illustrated system 100 includes distribution substation 101 structured to receive power from a power source (not pictured), transform the power by stepping up or stepping down the voltage, and distributing the power to the remaining system 100. System 100 further includes feeder power lines 103 and 109 electrically coupled with distribution substation 101.

System 100 further includes electromechanical device 105 coupled to line 103. In the illustrated embodiment, device 105 is a voltage regulator having a tap position control setting and structured to maintain a constant voltage level based on the tap position control setting. It shall be appreciated that any or all of the foregoing features of voltage regulator 105 may be present in the other electromechanical devices disclosed herein. Connection point 107 is coupled to line 103 and structured to selectively couple a lateral power line, not pictured, to line 103. Connection point 107 is further structured to disconnect line 103 and the lateral power line in the event of an overvoltage or undervoltage within line 103 or the lateral power line. It shall be appreciated that any or all of the foregoing features of connection point 107 may be present in the other connection points disclosed herein.

System 100 further includes connection point 111 coupled to line 109 and structured to selectively couple lateral power line 121 to line 109. Electromechanical device 113 is coupled to line 109. In the illustrated embodiment, device 113 is a switched capacitor bank having an on/off control setting and structured to regulate reactive power within line 109 by selectively charging and discharging a plurality of capacitors. It shall be appreciated that any or all of the foregoing features of switched capacitor bank 113 may be present in the other switched capacitor banks disclosed herein. Connection point 115 is coupled to line 109 and is structured to selectively couple line 109 and lateral power line 129. System 100 further includes voltage regulator 117 coupled to line 109. Lines 103 and 109 are selectively coupled by way of tie switch 119.

System 100 further includes load 123 coupled to lateral power line 121 by way of transformer 127 and meter 125. Load 123 is structured to receive power from line 121. In the illustrated embodiment, load 123 is an industrial electricity user. Load 123 may be a residential or commercial electricity user. It shall be appreciated that any or all of the foregoing features of load 123 may be present in the other loads disclosed herein. Transformer 127 is structured to step down or step up the voltage of the power being transferred from line 121 to load 123. It shall be appreciated that any or all of the foregoing features of transformer 127 may be present in the other transformers disclosed herein.

Meter 125 is one of a plurality of meters referred to as an advanced metering infrastructure (AMI) as discussed in more detail below. Meter 125 is structured to take electrical measurements and provide the measurements to central electronic control system 179. In certain embodiments, the electrical measurements may be at least one of voltage measurements, current measurements, real power measurements, reactive power measurements, and power factor measurements. Meter 125 may be structured to receive a command to take an electrical measurement or may be structured to take an electrical measurement without receiving a command, such as taking an electrical measurement every minute. It shall be appreciated that any or all of the foregoing features of meter 125 may be present in the other meters disclosed herein.

System 100 further includes Load 137 coupled to lateral power line 129 by way of transformer 133 and meter 135. System 100 further includes secondary power line 141 coupled to lateral power line 129 by way of transformer 139. Load 145 is coupled to line 141 by way of meter 143.

Load 149 and DER 151 are coupled to line 141 by way of meter 147. DER 151 is structured to provide power to system 100. In certain embodiments, DER 151 includes a DC power source and a smart inverter structured to communicate with central electronic control system 179 and structured to selectively receive power from the DC source, convert the DC power to AC power, and provide power to line 141. It shall be appreciated that any or all of the foregoing features of DER 151 may be present in the other distributed energy resources disclosed herein. Load 155 and DER 157 are coupled to line 141 by way of meter 153.

System 100 further includes secondary power line 161 coupled to lateral power line 129 by way of transformer 159. Load 165 is coupled to line 161 by way of meter 163. Load 169 and DER 171 are coupled to line 161 by way of meter 167. Similarly, Load 175 and DER 177 are coupled to line 161 by way of meter 173.

Central electronic control system 179 is structured to monitor and regulate electrical characteristics in system 100 by communicating with the meters, the electromechanical devices, and the distributed energy resources of system 100. System 179 includes a communication transceiver, not pictured, coupled to electromechanical devices 105, 113, and 117 by way of communication line 181. Line 181 is further coupled to substation 101 having an electromechanical device structured to adjust feeder voltage. System 179 is further coupled to meters 125, 135, 143, 147, 153, 163, 167, and 173 by way of the communication transceiver and communication line 183. In certain embodiments, at least one of electromechanical devices 105, 113, and 117 and meters 125, 135, 143, 147, 153, 163, 167, and 173 communicate with system 179 by way of a wireless connection. In certain embodiments, system 179 is a plurality of controller devices.

System 179 further includes a memory device, not pictured, structured to store data received by the communication transceiver. System 179 further includes a processing unit structured to receive electrical measurements from the communication transceiver, transmit perturbation signals and control signals to the communication transceiver, receive data stored on the memory device, transmit data to the memory device to be stored, and programmed to receive historical electrical measurements generated by the plurality of electronic power meters, determine the sensitivities of system voltages over the change in aggregate real power consumption, aggregate reactive power consumption, aggregate distributed energy resource real power generation, aggregate distributed energy resource reactive power generation, switched capacitor bank reactive power generation and voltage regulator tap position, identify a predictive model based on the determined voltage sensitivities, and transmit at least one command signal to the communication transceiver, each command signal being structured to modify power line characteristics by controlling a setting of one of the electromechanical devices or one setting of the distributed energy resources.

It is contemplated that the various aspects, features, processing devices, processes, and operations from the various embodiments may be used in any of the other embodiments unless expressly stated to the contrary. Certain operations illustrated may be implemented by a computer executing a computer program product on a non-transient computer readable storage medium, where the computer program product includes instructions causing the computer to execute one or more of the operations, or to issue commands to other devices to execute one or more operations.

In certain embodiments, the processing unit receives historical measurements generated by the meters and electromechanical devices of system 100 by receiving electrical measurements, storing the electrical measurements in the memory device, and requesting the electrical measurements from the memory device. Historical measurements may include switched capacitor bank status, voltage regulator tap positions, total load real and reactive power, and total DER real and reactive power.

System 179 is structured to transmit command signals to the electromechanical devices of system 100 and further structured to receive measurements from the meters of system 100. In certain embodiments, system 179 is further structured to transmit command signals to the smart inverters of the distributed energy resources of system 100, the signals structured to control the power factor setting of the smart inverters. The command signals are generated based on a predictive control model, as explained in more detail below.

Figure 2:
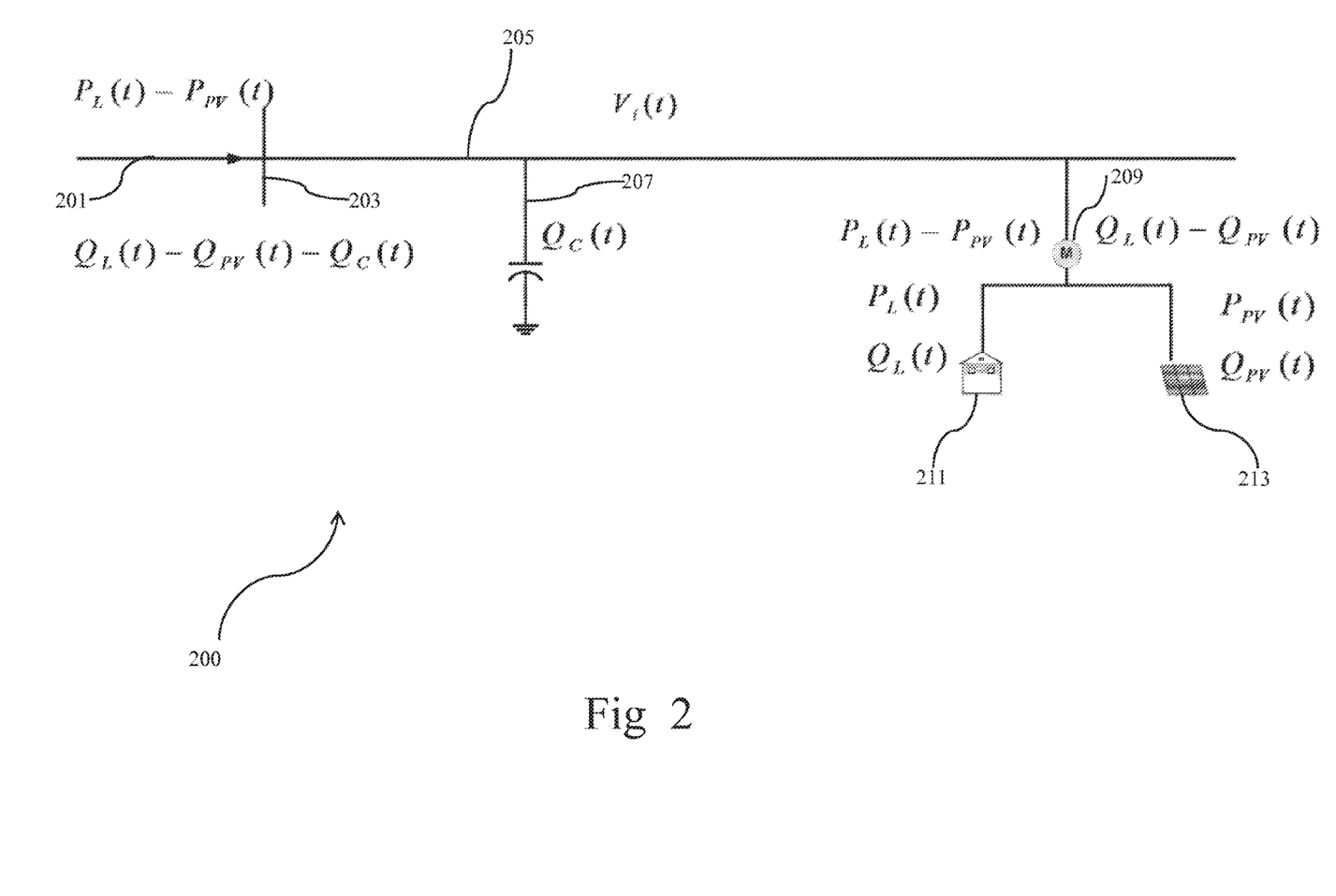
FIG. 2 is a schematic diagram illustrating an exemplary power distribution system.

With reference to FIG. 2 there is illustrated an exemplary power distribution system 200 in communication with a power device controller, not pictured, such as system 179 in FIG. 1. System 200 includes a distribution substation 201 coupled to a power line 205. Marker 203 identifies a point on line 205 as described in more detail below. Switched capacitor bank 207 is coupled to line 205. Load 211 and DER 213 are coupled to line 205 by way of meter 209.

In certain embodiments, one or more of power flow information of the power distribution system, phasing information of at least one lateral power line or at least one secondary power line relative to the feeder power line, and impedance information of at least one lateral power line or at least one secondary power line relative to the feeder power line is unknown to the power device controller. In order to regulate electrical characteristics of system 200, the power device controller is structured to generate a model of system 200 by creating a sensitivity matrix.

Using electrical measurements taken from the meter 209, the voltage across feeder line 203 can be estimated. Meter 209 is structured to determine the real and reactive at marker 203 since the real and reactive power at marker 203 is equal to the aggregate real power and reactive power observed at meter 209 when switched capacitor hank 207 is inactive. The voltage across power line 205 can be estimated using the following equations, where $V_i$ is the voltage across the line, $P_L^{total}$ is the aggregated real power consumption, $Q_L^{total}$ is the aggregated reactive power consumption, $P_{DER}^{total}$ is the aggregated DER real power generation, $Q_{DER}^{total}$ is the aggregated DER reactive power generation, $Q_c$ is the switched capacitor bank reactive power generation, Tap is the tap position of the voltage regulator, T is the length of interval over which the load is considered stationary, and kT is the kth interval (kT, (k−1)T).

$$V_i(kT) = f_i(x) = \\ f_i(P_L^{total}(kT), Q_L^{total}(kT), P_{DER}^{total}(kT), Q_{DER}^{total}(kT), Q_c(kT), \text{Tap}(kT)) \quad (1)$$

$$V_i((k+1)T) = V_i(kT) + \nabla f_i(x(kT)) \nabla x(kT) \quad (2)$$

$$\nabla f_i(x(kT)) = \left[ \frac{\partial f_i(kT)}{\partial P_L^{total}} \; \frac{\partial f_i(kT)}{\partial Q_L^{total}} \; \frac{\partial f_i(kT)}{\partial P_{DER}^{total}} \; \frac{\partial f_i(kT)}{\partial Q_{DER}^{total}} \; \frac{\partial f_i(kT)}{\partial Q_c} \; \frac{\partial f_i(kT)}{\partial \text{Tap}} \right] \quad (3)$$

$$\Delta x(kT) = \quad (4)$$
$$x((k+1)T) - x(kT) = [\Delta P_L^{total} \; \Delta Q_L^{total} \; \Delta P_{DER}^{total} \; \Delta Q_{DER}^{total} \; \Delta Q_c \; \Delta \text{Tap}]^T$$

An interval is defined based on the various combination of loading levels and DER generation levels to more accurately estimate the sensitivity measures over feeder loading and DER generation. In certain embodiments, the length of the interval is 15 minutes.

Since system 200 includes one load 211 and one DER 213, both of which are coupled to line 205 through the same meter 209, only the net real and reactive power electrical measurements are available. $P_L^{total}$, $Q_L^{total}$, $P_{DER}^{total}$, and $Q_{DER}^{total}$ can be calculated using the electrical measurements from meter 209 and historical data. Specifically, based on the net measured real and reactive power, and historically forecasted DER real power and reactive power, the load real and reactive power can be estimated.

In certain embodiments, load 211 and DER 213 may be individually metered. In an individually metered arrangement, rather than observing only the net real and reactive power, the load real power and load reactive power can be observed separately from the DER real power and DER reactive power.

With continuing reference to FIG. 1, $P_L^{total}$, $Q_L^{total}$, $P_{DER}^{total}$, and $Q_{DER}^{total}$ are determined by adding the values for real power consumption, reactive power consumption, DER real power generation, and DER reactive power generation which were measured at each meter in system 100. In certain embodiments, less than all of the meters of system 100 are necessary to determine $P_L^{total}$, $Q_L^{total}$, $P_{DER}^{total}$, and $Q_{DER}^{total}$ for system 100.

Figure 3:
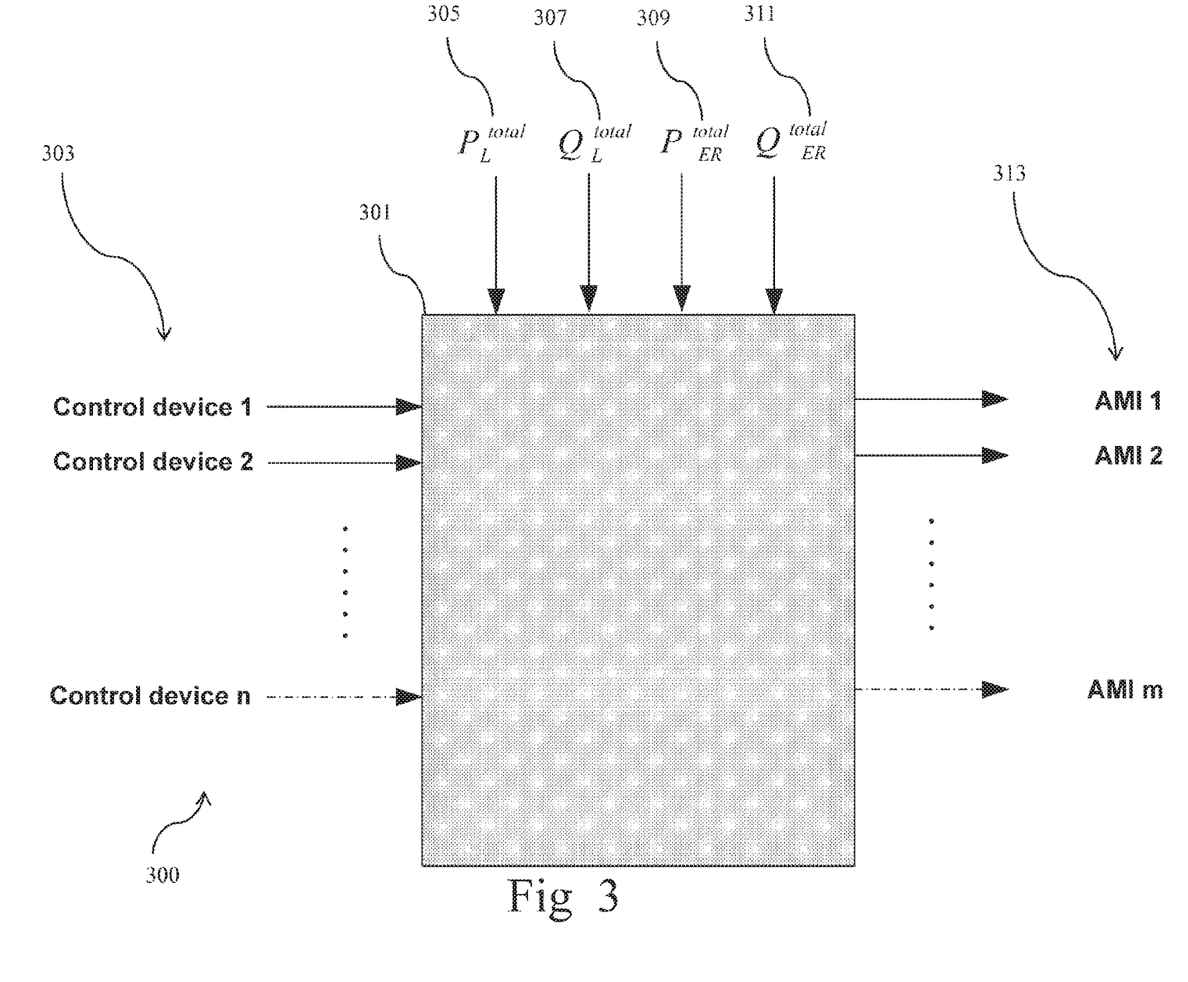
FIG. 3 is a flow diagram illustrating an active measurement set creation process.

With reference to FIG. 3, there is illustrated a process for generating AMI measurements 300. Each AMI measurement 313 is the voltage detected at one meter in the power distribution system. As shown in equation 1 above, voltage is calculated using data indicating the status of each electromechanical device, as well as the aggregate real power consumption 305, aggregate reactive power consumption 307, aggregate DER real power generation 309, and aggregate DER reactive power generation 311 as calculated using the electrical measurements from the meter in the power distribution system.

For the purposes of identifying a system model, a subset of the AMI measurements 313, referred to as an active measurement set (AMS), may be sufficient to delineate the boundary of the feeder voltage dispersions. As a power distribution system changes, the AMS subset of AMI measurements may change such that the subset collectively captures the extreme variations on the feeders of the power distribution system. For example, the AMS subset may include the AMI measurement indicating the lowest voltage within the power distribution system as well as the AMI measurement indicating the highest voltage within the power distributions system. In certain embodiments, the power device controller may perform analysis daily or weekly to determine whether an AMI measurement should be added to the AMS or whether an AMI measurement of the AMS should be removed from the AMS. In certain embodiments, an initial AMS may contain 20 or more AMI measurements identified by a system administrator. AMS data is stored as historical measurements. In some embodiments, the historical measurements are stored by the controller on the memory device.

With continuing reference to FIG. 1, system 179 may be structured to determine portions of the sensitivity matrix indicating sensitivity to variation in reactive power of the switched capacitor banks, and variation in tap position of the voltage regulators of sensitivity matrix by applying controlled perturbation to the power distribution system 100. The perturbation analysis described below is only necessary when there is insufficient historical data to determine sensitivity measures of voltage with respect to $Q_c$ and Tap.

In certain embodiments, to determine the sensitivity measures of voltage with respect to $Q_c$ and Tap, a power device controller is structured to perform perturbation analysis on each electromechanical device in a power distribution system. For example, perturbation analysis may be used to determine the sensitivity measures of voltage with respect to $Q_c$ and Tap when there is insufficient historical measurements reflecting electromechanical device control in order to perform reliable regression analysis. With continuing reference to FIG. 2, a power device controller would perform perturbation analysis to determine the sensitivity measures of voltage with respect to $Q_c$ for switched capacitor hank 207. Perturbation analysis is performed by taking an AMI measurement using meter 209, changing a control setting such as the on/off status of switched bank capacitor 207, taking a second AMI measurement using 209, and comparing the AMI measurements. The change in voltage observed at meter 209 divided by the change in switched capacitor bank 207 reactive power is the sensitivity of voltage at meter 209 with respect to the control setting change of switched capacitor bank 207. The calculation of the sensitivity of voltage at a point in a power distribution system is shown in the following equation where S is the voltage sensitivity, i is the location of the electrical measurement, j is the electromechanical device observed, $\Delta m_i$ is the change in voltage at point i, and $\Delta c_j$ is the change in switched capacitor bank j.

$$S_{i,j} = \Delta m_i / \Delta c_j$$

For calculating the sensitivity of voltage with respect to voltage regulator tap position, $\Delta c_j$ is replaced by $\Delta \text{Tap}_j$, wherein $\Delta \text{Tap}_j$ is the change in the tap position of voltage regulator j. For systems with more than one electromechanical device, perturbation analysis is performed to determine the sensitivity measures of voltage with respect to $Q_c$ or Tap value for each electromechanical device.

The power device controller for system 200 is programmed to generate perturbation signals during a time interval of low activity on the power distribution system. The power device controller may be structured to apply the controlled perturbation to the power distribution system during time intervals when the distributed energy resources are substantially inactive.

Central electronic control system 179 is structured to determine at least a portion of the sensitivity matrix indicating voltage sensitivity to variation in aggregate real power consumption of the feeder power line, variation in aggregate reactive power consumption of the feeder power line, variation in aggregate real power generation of the distributed energy resources, variation in aggregate reactive power generation of the distributed energy resources, variation in switched capacitor bank reactive power generation and variation in voltage regulator tap position by performing a regression analysis upon a set of multiple measurements of voltage, aggregate real power consumption of the feeder power line, aggregate reactive power consumption of the feeder power line, aggregate real power generation of the distributed energy resources, aggregate reactive power generation of the distributed energy resources, and information of the state of the switched capacitor banks and the voltage regulators over a plurality of time intervals. In certain embodiments, system 179 may use regression analysis to determine portions of the sensitivity matrix indicating sensitivity to changes in switched capacitor bank status and voltage regulator tap position.

Through regression analysis of the AMS historical measurements, the sensitivity of voltage measurements over the change of $P_L^{total}$, $Q_L^{total}$, $P_{DER}^{total}$, $Q_{DER}^{total}$, $Q_c$, Tap may be estimated. It is assumed the calculated sensitivities are time invariant within each interval. These sensitivity calculations as well as the results of the perturbation analysis yield a sensitivity matrix for the given internal.

The sensitivity matrix indicates sensitivity of a voltage of the feeder power line to variation in aggregate real power consumption of the feeder power line, variation in aggregate reactive power consumption of the feeder power line, variation in aggregate real power generation of the distributed energy resources, variation in aggregate reactive power generation of the distributed energy resources, variation in reactive power of the switched capacitor banks, and variation in tap position of the voltage regulators.

For the linear regression analysis, equations (1)-(4) above are combined to create the following equation for deriving the change in voltage of a feeder line between interval kT and (k+1)T:

$$\Delta V_i(kT) = \nabla f_i \times \Delta x(kT) = \Delta x^T(kT) \times \nabla f_i^T \quad (5)$$

By stacking up a series of equations like (5) from multiple intervals, an overdetermined system can be formed to solve for the sensitivity vector $\nabla f_i$. The overdetermined system can be written in the following format:

$$z = Ay \quad (6)$$

Where $$z = \begin{bmatrix} \Delta V_i(T) \\ \Delta V_i(2T) \\ \vdots \\ \Delta V_i(nT) \end{bmatrix}$$

$$A = \begin{bmatrix} \Delta x^T(T) \\ \Delta x^T(2T) \\ \vdots \\ \Delta x^T(nT) \end{bmatrix}$$

$$y = \nabla f_i^T$$

Equation (6) can be solved using least-squares method as shown below or other recursive variations.

$$y = (A^T A)^{-1} A^T z$$

To more accurately estimate the sensitivity measures over feeder loading and DER generation, we can calculate the sensitivity matrix for a sub-period within a day based on the various combinations of loading levels and DER generation levels. For example, a sub-period may be defined as 1:00 p.m. to 3:00 p.m. when DER generation levels are high and loading levels are low, or a sub-period may be defined as 9:00 p.m. to 11:00 p.m. when loading levels and DER generation levels are low. As a result, a sensitivity matrix for each sub-period is yielded.

Figure 4:
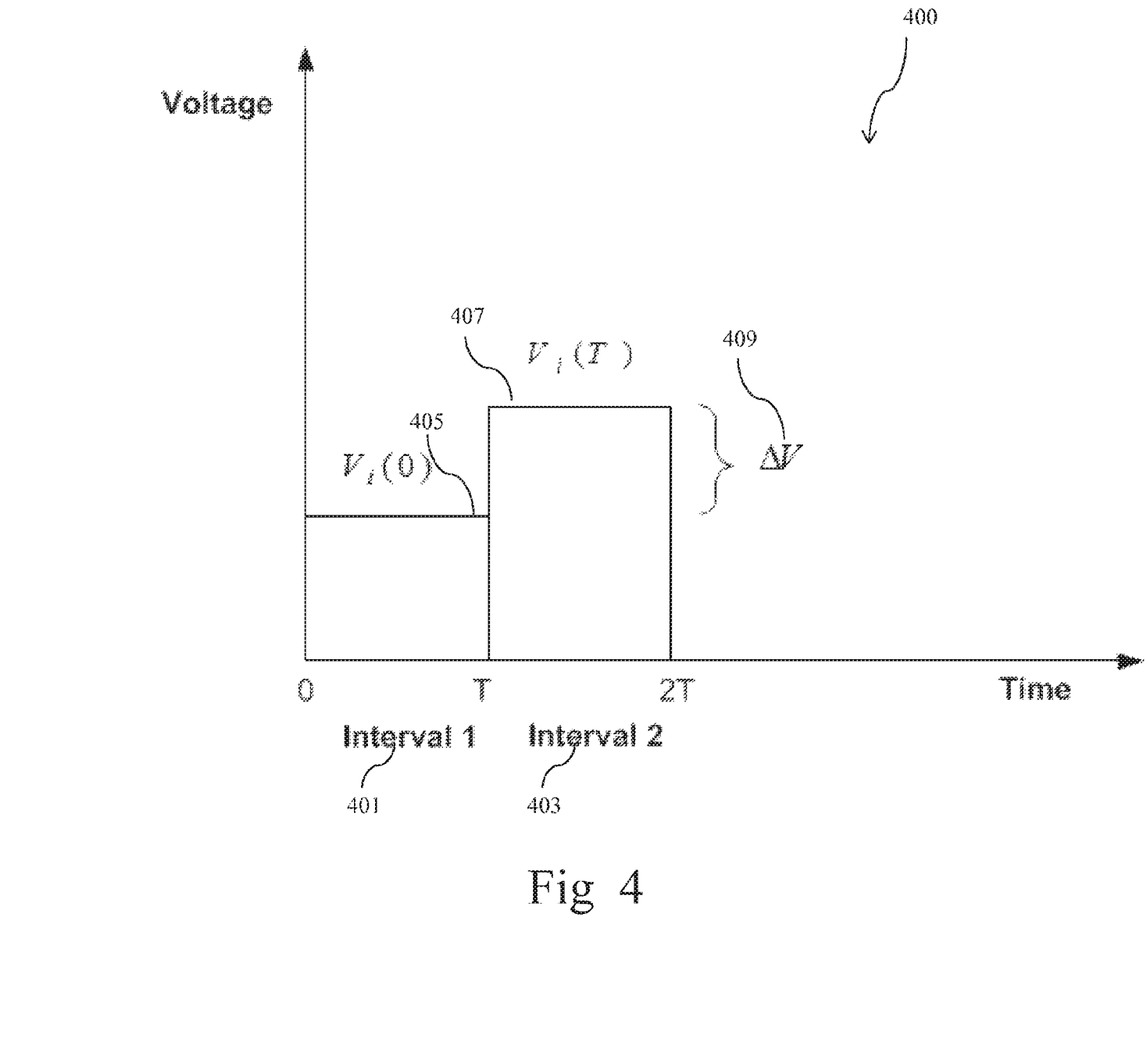
FIG. 4 is a graph illustrating a series of calculated feeder voltages.

With reference to FIG. 4 there is illustrated graph 400 depicting a change in an AMI measurement over a series of intervals. Graph 400 includes a first voltage level 405 corresponding to a first time interval 401, a second voltage level 407 corresponding to a second time interval 403, and a voltage difference 409 between the first voltage level 405 and second voltage 407.

With continuing reference to FIG. 1, system 179 determines a plurality of commands including switching commands for the switched capacitors, tap position commands for the voltage regulators, and power factor commands for the distributed energy resources, using a model predictive controller structured to determine the plurality of control commands based upon a predicted total real power demand of the entire feeder, a predicted total reactive power demand of the entire feeder, a predicted total real power generation of the distributed energy resources, a predicted real power demand uncertainty range, and a sensitivity matrix. System 179 then transmits the switching commands to the switched capacitors, the tap position control signals to the voltage regulators and the power factor control signals to the distributed energy resource devices.

In a certain embodiments, the model predictive controller is structured to determine values of the plurality of commands such that a predicted voltage of the feeder power line meets a predetermined criterion. The model predictive controller utilizes a linear relationship between variation of voltage of the feeder power line and variation of aggregated real power consumption of the feeder power line, aggregated reactive power consumption of the feeder power line, aggregated real power generation of the distributed energy resources, aggregated reactive power generation of the distributed energy resources, reactive power of the switched capacitors and tap position of the voltage regulators.

While the present disclosure has been illustrated and described in detail in the drawings and foregoing description, the same is to be considered as illustrative and not restrictive in character, it being understood that only certain exemplary embodiments have been shown and described and that all changes and modifications that come within the spirit of the present disclosure are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the present disclosure, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically slated to the contrary.

The invention claimed is:

1. A power device controller for controlling a power distribution system having at least one feeder, at least one electromechanical device and at least one distributed energy resource without using a power flow model, the controller comprising:
- a communication transceiver structured to receive electrical measurements from a plurality of electronic power meters, the transceiver additionally structured to transmit perturbation signals to the at least one electromechanical device, and the transceiver additionally structured to transmit control signals to the at least one electromechanical device and the at least one distributed energy resource;
- a memory device structured to store electrical measurements received by the communication transceiver; and
- a processing unit structured to receive electrical measurements from the communication transceiver, transmit perturbation signals and control signals to the communication transceiver, receive data stored on the memory device, transmit data to the memory device to be stored, and programmed to:
- receive historical measurements generated by the plurality of electronic power meters and the at least one electromechanical device,
- determine the sensitivities of system voltages over changes in aggregate real power consumption, aggregate reactive power consumption, aggregate distributed energy resource real power generation, aggregate distributed energy resource reactive power generation, switched capacitor bank reactive power generation and voltage regulator tap position using one of only the historical measurements or, if the historical measurements are determined to be insufficient, a combination of the historical measurements and one or more responses to the perturbation signals,
- identify a predictive model based on the determined sensitivities of system voltages, and
- transmit at least one command signal to the communication transceiver, the at least one command signal being structured to modify power line characteristics by controlling a setting of one of the at least one electromechanical device or the at least one distributed energy resource.

2. The controller of claim 1 wherein the electrical measurements are at least one of voltage measurements, current measurements, real power measurements, reactive power measurements, and power factor measurements.

3. The controller of claim 1 wherein the electromechanical devices are each one of a switched capacitor bank and a voltage regulator.

4. The controller of claim 3 wherein the setting controlled by the control signal is one of the tap position of the voltage regulators, the on/off status of the switch capacitors, and the power factor setting of the distributed energy resources.

5. The controller of claim 1 wherein the central processing unit is programmed to determine the sensitivities of system voltages over the change in switched capacitor bank reactive power generation and voltage regulator tap position by transmitting a plurality of perturbation signals to the communication transceiver, each perturbation signal being structured to control a setting of one electromechanical device, and receiving electrical measurements from the plurality of electronic power meters generated following each of the perturbation signals.

6. The controller of claim 1 wherein at least one of the at least one distributed energy resource comprises a smart inverter and a DC power source and the communication transceiver transmits controls signals to the smart inverter of the distributed energy resource.

7. The controller of claim 1 wherein the processing unit receives historical measurements generated by the plurality of electronic power meters by receiving electrical measurements from the plurality of electronic power meters, storing the electrical measurements in the memory device, and requesting the electrical measurements from the memory device.

8. The controller of claim 1 wherein the historical electrical measurements taken by the electronic power meters and received by the processing unit are generated by a subset of the plurality of electronic power meters, the subset of the plurality of electronic power meters being selected such that the subset collectively captures the extreme variations on the feeders of the power distribution system.

9. The controller of claim 8 wherein the subset of plurality of electronic power meters is analyzed and selectively modified on at least a weekly basis.

10. The controller of claim 1 wherein at least one of the sensitivities of system voltages over the change in aggregate real power consumption, aggregate reactive power consumption, aggregate distributed energy resource real power generation, aggregate distributed energy resource reactive power generation, switched capacitor bank reactive power generation, and voltage regulator tap position are estimated through regression analysis.

11. The controller of claim 1 wherein sensitivities are calculated for a sub-period within a day, the sub-period being determined by the various combinations of loading levels and DER generation levels.

12. The power distribution system of claim 1 wherein the controller is configured to control the processing unit to transmit the perturbation signals when the distributed energy resources are inactive.

13. A power distribution system comprising:
- a distribution substation;
- a feeder power line electrically coupled with the distribution substation;
- at least one lateral power line electrically coupled with the feeder line;
- at least one secondary power line electrically coupled with the at least one of the lateral power lines;
- at least one switched capacitor bank electrically coupled with at least one of the feeder power line, one of the lateral power lines, and one of the secondary power lines;
- at least one voltage regulator electrically coupled with at least one of the feeder power line, one of the lateral power lines, and one of the secondary power lines;
- at least one load system electrically coupled with the respective feeder power line, lateral power line or secondary power line, the load system including an electronic power meter electrically coupled with the respective feeder power line, lateral power lines or secondary power lines, and a distributed energy resource electrically coupled with each electronic power meter; and
- a central electronic control system in operative communication with the switched capacitor banks, the voltage regulators, and the distributed energy resources, the central electronic control system being structured to
- determine a plurality of control commands including switching commands for the switched capacitors, tap position commands for the voltage regulators, and power factor commands for the distributed energy resources, using a model predictive controller structured to determine the plurality of control commands based upon a predicted aggregate real power demand of the entire feeder, a predicted aggregate reactive power demand of the entire feeder, a predicted aggregate real power generation of the distributed energy resources, a sensitivity matrix, and the predicted real power demand uncertainty range, and transmit the switching commands to the switched capacitors, the tap position commands to the voltage regulators and the power factor commands to the distributed energy resource devices.

14. The system of claim 13 wherein the sensitivity matrix indicates sensitivity of a voltage of the feeder power line to variation in aggregate real power consumption of the feeder power line, variation in aggregate reactive power consumption of the feeder power line, variation in aggregate real power generation of the distributed energy resources, variation in aggregate reactive power generation of the distributed energy resources, variation in reactive power of the switched capacitor banks, and variation in tap position of the voltage regulators.

15. The power distribution system of claim 13 wherein the central electronic control system is structured to determine portions of the sensitivity matrix indicating sensitivity to variation in reactive power of the switched capacitor banks, and variation in tap position of the voltage regulators of sensitivity matrix by applying controlled perturbation to the power distribution system.

16. The power distribution system of claim 15 wherein the central electronic control system is structured to apply the controlled perturbation to the power distribution system during time intervals when the distributed energy resources are inactive.

17. The power distribution system of claim 14 wherein the central electronic control system is structured to determine at least a portion of the sensitivity matrix indicating sensitivity to variation in aggregate real power consumption of the feeder power line, variation in aggregate reactive power consumption of the feeder power line, variation in aggregate real power generation of the distributed energy resources, variation in aggregate reactive power generation of the distributed energy resources by performing a regression analysis upon a set of multiple measurements of voltage, aggregate real power consumption of the feeder power line, aggregate reactive power consumption of the feeder power line, aggregate real power generation of the distributed energy resources, aggregate reactive power generation of the distributed energy resources, and information of the state of the switched capacitor banks and the voltage regulators over a plurality of time intervals.

18. The power distribution system of claim 17 wherein the plurality of time intervals are selected to include a plurality of combinations of aggregate real power consumption of the feeder power line, aggregate reactive power consumption of the feeder power line, aggregate real power generation of the distributed energy resources, and aggregate reactive power generation of the distributed energy resources.

19. The power distribution system of claim 13 wherein the model predictive controller is structured to determine values of the plurality of control commands such that a predicted voltage of the feeder power line meets a predetermined criterion.

20. The power distribution system of claim 13 wherein the model predictive controller utilizes a linear relationship between variation of voltage of the feeder power line and variation of aggregated real power consumption of the feeder power line, aggregated reactive power consumption of the feeder power line, aggregated real power generation of the distributed energy resources, aggregated reactive power generation of the distributed energy resources, reactive power of the switched capacitors and tap position of the voltage regulators.

21. The power distribution system of claim 13 wherein one or more of power flow information of the power distribution system, phasing information of the at least one lateral power line and at least one secondary power line relative to the feeder power line, and impedance information of the at least one lateral power line and at least one secondary power line relative is unknown to the central electronic control system.

* * * * *